May 2, 1933.  L. A. SCHULKE  1,906,637
COMPOSITION BOARD
Filed Jan. 3, 1930
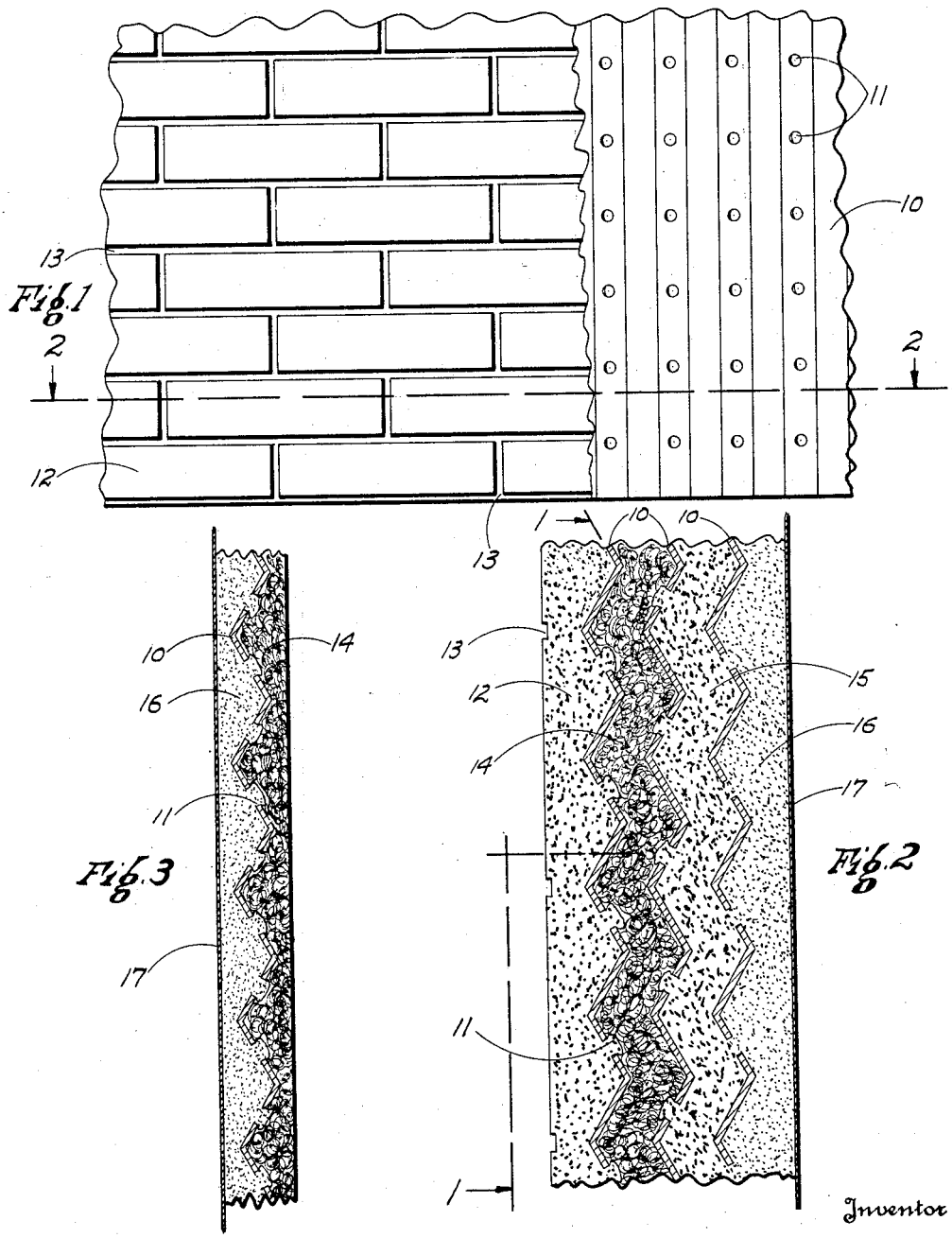

Patented May 2, 1933

1,906,637

UNITED STATES PATENT OFFICE

LOUIS A. SCHULKE, OF LAKEWOOD, OHIO

COMPOSITION BOARD

Application filed January 3, 1930. Serial No. 418,356.

This invention relates to composition boards and more particularly to reinforced composition boards to be used as building material.

One object of the invention is to provide a reinforcement for a composition board, which is substantially rigid.

Another object is to provide a reinforcement which may be readily cut and nailed to facilitate manipulation thereof.

Another object is to provide a composition board for use as a building material which includes a finished interior wall surface and a heat and sound insulating portion.

A further object is to secure a reinforced composition board constructed and finished to serve as an exterior building wall.

Other objects relating to details of construction and economies of manufacture will become apparent upon a more complete examination of this specification.

In the accompanying drawing:

Figure 1 is a front elevation of a composition board constructed in accordance with this invention, a portion of the plaster being broken away in order to show the reinforcement;

Figure 2 is a section taken on the line 2—2 of Figure 1; and

Figure 3 is a similar section showing a modified form of board.

Referring to the drawing, the composition board shown in Figures 1 and 2 is composed of alternate layers of plaster composition and reinforcement and has one surface designed to form the exterior wall of a building and the other surface designed to form an interior wall. The reinforcing members 10 consist of sheets of hard pressed fiber or equivalent material capable of withstanding high compressive forces and having sufficient inherent rigidity to be self-sustaining without bending or buckling. Ordinary hard pressed fiber, such as commonly used in a great many constructions as a substitute for wood or metal, possesses these characteristics and in addition is highly resistant to the softening action of moisture. If desired, however, the reinforcing material may be impregnated or coated with any conventional water proofing substance, or the sheet may be pressed from rubberized fiber or other moisture resisting material.

The reinforcing members 10 are formed with apertures 11 which are preferably staggered in adjacent sheets as shown in Figure 2. The exterior wall surface is formed by a layer 12 of hard, weather resistant plaster, such as stucco or the like, the surface thereof being preferably scored as indicated at 13, to resemble brick or tile. A layer 14 of heat and sound insulating composition, such as hair or felt bound together with a relatively small amount of plaster or cement, is disposed adjacent the exterior layer 12, being separated therefrom by one of the reinforcing sheets 10. A firm bond is formed between the two layers of composition through the apertures 11.

Adjacent the composition 14 and separated therefrom by one of the reinforcing sheets 10 is a layer 15 of dense, rigid, plaster composition of any suitable type, such as sand, cinder, or precipitate ash cement. The interior surface of the board is formed by a layer 16 of finishing plaster of any suitable type separated from the composition 15 by another reinforcing sheet 10. This material may be what is known as acoustical plaster; that is, plaster with a relatively small amount of hair or felt incorporated therein, and having a stipled surface to break up sound waves and prevent echoes. Substantially the same result may be obtained, however, by utilizing any conventional plaster composition and covering the same with fabric 17. Any particular fabric, such as burlap, linen or homespun may be selected in accordance with the taste of the designer. As a further alternative, the surface may consist of a sheet of hard-pressed fibrous material imbedded in the adjacent layer of composition or plaster.

Any desired coloring material may be incorporated in the exterior layer 12 or in the interior layer 16, or any particular type of surface ornamentation may be superimposed thereon.

As shown in Figures 1 and 2 the reinforcing sheets 10 are preferably formed with corrugations or flutes extending in line with the forces to which the board is to be subjected. These corrugations or flutes prevent any tendency of the reinforcing sheet to buckle under load. As shown, the corrugations in the three reinforcing sheets extend in the same direction. However, if it is desired to subject the board to forces at angles to each other, it is to be understood that the corrugations in the different reinforcing sheets may extend in different directions.

The composition board shown in Figure 3 consists of a single reinforcing sheet 10 embedded in plaster composition of any suitable type. As shown, one side of the reinforcing sheet is covered with a layer of finishing plaster 16 and the opposite side is covered with a layer of heat and sound insulating composition 14. As in the embodiment previously described, the reinforcing sheet 10 is formed with apertures 11, through which the composition on the opposite sides thereof are bound together. The finished surface of the board may be covered by fabric 17, or may be colored in any of the manners described above.

In use the composition board may be precast as wall sections, or panels in the conventional manner, the increased strength due to the reinforcement enabling the sections to be made larger than has been customary heretofore. The panels or wall sections may be cast complete or may consist only of the reinforcement and the backing or insulating composition so that the finishing composition may be applied to the wall sections after installation. In certain types of construction the latter is preferable since the wall may then be finished without dividing the same into panels. As a further alternative the composition material may be built up from reinforcing sheets and plaster when a building is being constructed.

By using a plurality of layers of plaster composition and reinforcing sheets as shown in Figures 1 and 2, the structure is adapted to serve as a supporting wall as a substitute for bricks or studding. Since the reinforcing sheets may be pierced by nails or drilled in much the same manner as wood, the structure can be readily secured at any desired point. Furthermore, the use of moisture resistant reinforcing material prevents rapid softening and deterioration under the action of the weather. The interior finishing surface may be carried by the supporting wall, as shown, or may be constructed separately.

The structure shown in Figure 3 is adapted to serve as an interior wall covering in the manner in which ordinary wall board is used, and may be nailed directly to the studding in a frame building, or may be used in combination with a supporting wall constructed as described above.

Although the foregoing description is necessarily of a detailed character in order that the invention may be fully set forth, it is to be understood that modifications and re-arrangements of the parts may be resorted to without departing from the spirit and scope of the invention as defined in the following claims.

I claim:

1. A pre-cast wall section including a layer of plastic material, a layer of insulating material and a hard pressed fiber reinforcing sheet embedded therebetween.

2. A pre-cast wall section including a layer of plastic composition, a layer of insulating material, and an apertured sheet of hard presser fiber disposed therebetween, said plaster and said insulating material being bound together through said apertures.

3. A wall including a plurality of layers of plastic composition material, certain of said layers consisting of insulating material and other of said layers consisting of rigid material, and a plurality of reinforcing sheets separating adjacent layers and embedded therein.

4. A pre-cast wall section including a layer of plastic composition, a layer of insulating material, and an apertured sheet of hard pressed fiber disposed therebetween, the material formed to provide apertures through which the insulating material and plastic composition may interlock, said plaster and said insulating material being bound together through said apertures.

5. A wall including a plurality of layers of plastic composition material, certain of said layers consisting of insulating material and other of said layers consisting of rigid material, and a plurality of reinforcing sheets formed to provide a plurality of apertures therethrough through which a material may extrude to interlock said sheets separating adjacent layers and embedded therein.

6. A wall including a plurality of layers of composition material, certain of said layers consisting of insulating material and other of said layers consisting of rigid material, a plurality of corrugated reinforcing sheets separating the adjacent layers the material of said sheets forming orderly rows of apertures to permit the layers of composition material to be embedded about said sheets.

7. A wall including a plurality of layers of composition material, certain of said layers consisting of insulating material and other of said layers consisting of rigid material, a plurality of corrugated reinforcing sheets separating the adjacent layers the material of said sheets forming orderly rows of apertures to permit the layers of composition material to be embedded about said sheets, the apertures in adjacent sheets being in staggered relation to each other.

In testimony whereof I hereunto affix my signature this 27th day of December, 1929.

LOUIS A. SCHULKE.